(12) United States Patent
Kudelski et al.

(10) Patent No.: US 11,284,169 B2
(45) Date of Patent: Mar. 22, 2022

(54) METHOD OF AND A DEVICE FOR RENDERING CONTENT DATA OF A CONTENT DATA STREAM BASED ON A LEVEL OF TOXICITY OF THE CONTENT DATA STREAM

(71) Applicant: NAGRAVISION SA, Cheseaux-sur-Lausanne (CH)

(72) Inventors: André Kudelski, Cheseaux-sur-Lausanne (CH); Pierre Sarda, Cheseaux-sur-Lausanne (CH)

( * ) Notice: Subject to any disclaimer, the term of this patent is extended or adjusted under 35 U.S.C. 154(b) by 237 days.

(21) Appl. No.: 16/342,987

(22) PCT Filed: Nov. 2, 2017

(86) PCT No.: PCT/EP2017/078088
§ 371 (c)(1),
(2) Date: Apr. 18, 2019

(87) PCT Pub. No.: WO2018/083192
PCT Pub. Date: May 11, 2018

(65) Prior Publication Data
US 2020/0053434 A1 Feb. 13, 2020

(30) Foreign Application Priority Data
Nov. 4, 2016 (EP) .................................... 16197367

(51) Int. Cl.
*H04N 21/25* (2011.01)
*H04N 21/8358* (2011.01)
*H04N 21/254* (2011.01)
*H04N 21/4627* (2011.01)
*H04N 21/8355* (2011.01)

(52) U.S. Cl.
CPC ..... *H04N 21/8358* (2013.01); *H04N 21/2541* (2013.01); *H04N 21/4627* (2013.01); *H04N 21/8355* (2013.01)

(58) Field of Classification Search
None
See application file for complete search history.

(56) References Cited

U.S. PATENT DOCUMENTS

| | | |
|---|---|---|
| 2004/0088549 A1 | 5/2004 | Ukai et al. |
| 2008/0082448 A1 | 4/2008 | Meijer et al. |
| 2009/0150236 A1 | 6/2009 | Price |
| 2012/0011105 A1 | 1/2012 | Brock et al. |
| 2015/0142744 A1* | 5/2015 | Weinstein ............. G06F 3/0643 707/640 |

FOREIGN PATENT DOCUMENTS

EP 2763430 A1 8/2014

* cited by examiner

*Primary Examiner* — Cai Y Chen
(74) *Attorney, Agent, or Firm* — David P. Owen; Hoyng Rokh Monegier B.V.

(57) ABSTRACT

A method (1) of and a device for rendering content data of a content data stream. From content data identified in the content data stream, a level of toxicity is determined (4). The level of toxicity represents a measure of authenticity of the received content data stream. Content data of the received content data stream is rendered (6) based on an aggregated level of toxicity.

13 Claims, 2 Drawing Sheets

METHOD OF AND A DEVICE FOR RENDERING CONTENT DATA OF A CONTENT DATA STREAM BASED ON A LEVEL OF TOXICITY OF THE CONTENT DATA STREAM

TECHNICAL FIELD

The present disclosure relates to content data processing and, more particular, to rendering content data of a content data stream, such as a video or audio content data stream.

BACKGROUND

One of today's main concerns for content owners is piracy. Current solutions, including Conditional Access System (CAS) and The Rights Management (DRM) solutions show their limitation, as once their protection is removed to ensure the decoding and rendering, i.e. playing, of the content data at a rendering device, such as a display, TV screen, earphones, loudspeakers, etc. the captures or registrations are possible, enabling further transcoding and pirate exchanges in a very good quality (if not similar to the original) of the content.

Watermarking is currently positioned as the next step after CAS/DRM protection. Watermarking is based on the insertion, in a content data stream, of an invisible mark, containing unique information enabling identification of the content data stream, should its content be shared in an inappropriate manner. However, as such this does not immediately deter piracy, as further steps then will be necessary, mainly of a legal nature, such access to the pirate content through an appropriate monitoring system for example, perform watermark analysis to recover the hidden identity, ID, thereof, identify the end user with this ID, and finally to decide how to use this information. That is, prosecuting the identified person, providing a fine, terminating its subscription to particular data content or data sources, and many more.

What makes this even more difficult is that the end user perceiving such inappropriate content, in most cases, is not aware of the fact that the content is non-authentic, i.e. that the authenticity of the received content data stream is violated.

SUMMARY

It is an object of the present disclosure to provide a new, versatile method of and a device for rendering content data of a content data stream to discourage sharing of non-authentic content data.

In a first aspect there is provided a method of rendering content data of a content data stream, the method comprising the steps of:

receiving, by a data receiver, a content data stream, identifying, by an identification unit, content data of the received content data stream, determining, by a determination unit, a level of toxicity of the identified content data, the level of toxicity representing a measure of authenticity of the received content data stream, providing, by an aggregation unit, an aggregated level of toxicity from the determined level of toxicity, rendering, by a rendering device, content data of the received content data stream based on the aggregated level of toxicity.

The method according to the disclosure is a new technical solution to fight against non-authorized content sharing. With the disclosure, the rendering of content data received with a content data stream is affected depending on an aggregated toxicity level. The level of toxicity of identified content data of a content data stream provides a measure or indication of how authentic, or not authentic at all, the received content data stream is. By providing an aggregated level of toxicity, based on the determined level of toxicity, rendering of the content data can be controlled in a versatile manner.

In particular, the rendering of content data may be controlled in a manner that an end-user, perceiving the rendered content, becomes aware of the use of illegal or otherwise violated content, or content that is at least not used as intended by its legal provider, producer or content holder after a particular toxic content rendering time, i.e. after a particular amount of toxic content is played or otherwise reproduced, after a number of received toxic content data streams, and dependent on the frequency by which toxic content data is rendered, for example. The term toxic content is to be understood as content data of which a particular level of toxicity is determined.

In an embodiment of the disclosure, the content data rendering is affected if the aggregated level of toxicity exceeds a toxicity level threshold by applying at least one of:

content data rendering quality constraints, content data rendering time constraints, content data rendering selection, rendering toxicity information messages with rendered content data, and rendering, at least partly, content data other than content data received in the content data stream.

Non-exhaustive examples of content data rendering quality constraints comprise rendering the content in a lower or low resolution, i.e. a video and/or audio resolution lower than the authentic content resolution, rendering a colour video in black and white only, rendering stereo sound only monographic, etc. Content data rendering time constraints may comprise rendering the content data for a limited amount of time only, rendering the content data in a paused manner, i.e. by interrupting the rendering periodically, for example. Instead of rendering the received content data as a whole, selected parts of the content data may be rendered only or, to the contrary, selected parts of the content data may not be rendered at all. That is, content data rendering selection may comprise rendering user generated content data only, rendering content data classified as belonging to a certain type of content, for example advertisements, news, etc.

With the content data rendered, specific toxicity information messages may be rendered, i.e. displayed and/or in audio form, attending or notifying the end-user to the fact the content data is to a certain extent non-authentic. For example, when a predefined amount of non-authentic content is consumed, the end-user may not be able to continue watching and/or listening to illegal content or content data obtained illegally, unless he or she has purchased or has obtained some rights to be able to consume the content data on his/her content data rendering device.

Another measure in impeding the rendering of the content data may, for example, comprise playing completely or partly other content data than the one received with the content data stream. Such other content data may comprise messages or information prompting the end-user to obtain a legal or authentic content data stream. For example, in the case of internet shared video, the end user may be offered to perceive the content in a better quality via a legitimate portal, for example by a small prompt on a display or a TV screen.

The above measures, in isolation or in any manner combined, may be lessened or to the contrary tightened depended on the end-user behaviour. If, for example, the end user does not respond to prompts or messages or the like, other functionality of the rendering device may be affected, for example the operation with peripheral equipment, such as camera, a USB-stick, etc. or the quality of the rendering device itself may be affected, for example affecting the brightness of video or restricting the volume of an audio signal, etc.

The toxicity level threshold may be pre-set, for example. A particular setting of the toxicity level threshold may be device dependent and/or dependent on technical data, such as data relating to transmission capacity constraints.

In an embodiment of the disclosure, the aggregated level of toxicity and/or the toxicity level threshold are provided based on at least one of:

number of received content data streams,
content data rendering time,
frequency of content data rendering,
information provided in relation to the content data.

By taking into account both toxic and non-toxic content data in determining any or both of the aggregated level of toxicity or toxicity level threshold, a very versatile control of the content data rendering is provided.

For example, when only toxic content data is received and rendered, the aggregated level of toxicity may reach the toxicity level threshold faster compared to receiving a mix of toxic and non-toxic content data streams, for example. Same may apply for the total amount of time of rendering toxic and non-toxic content data, the frequency by which toxic and non-toxic content data is rendered, such as each month, each day or even a number of times per day, and whether or not warning or notifying messages related to the rendering of toxic content data have been made available with the rendered content data, for example. In case of ignoring warning messages, thus while toxic content is still rendered, the aggregated level of toxicity may also be reached faster, for example. As an alternative, or in addition to the manner in which the aggregated level of toxicity is calculated or adapted, the toxicity level threshold may also be adapted. Thus, the toxicity level threshold may be lowered or raised depending on the consumption of the user: it may be lowered when only toxic content data is rendered and may be raised in case of a mix of toxic and non-toxic content or when non-toxic content is rendered during at least a predetermined time, for example. The rendered content data depends on the consumption of content data, and content data type.

The aggregated level of toxicity and/or the toxicity level threshold may be stored, to control future rendering of toxic content based on previous rendered content. Thus, taking into account the consumption history of authentic questionable content by an end-user, for example. Based on this consumption history, the rendering of content data may be affected more severely or eventually the content data may not be rendered at all, for example. The aggregated level of toxicity and/or the toxicity level threshold may be stored at a remote server or database, for example. It will be well understood that the remote storage place is not a limited example, and a local memory can also be used.

It will be appreciated that when rendering toxic content, or when severe restrictions are applied, a message or messages may be forwarded to an external server or database, for information purposes, for example for identifying notorious users of compromised content.

In addition to pure technical parameters, commercial, business or management rules may be applied in rendering toxic content data. That is, the aggregated level of toxicity and/or the toxicity level threshold may be managed and determined based on plural rules for managing toxicity levels. For example, even if strongly toxic, content data may be rendered if such rules assign that a certain amount of toxic contents can be displayed before blocking because the content data is not actual anymore, is of fairly general nature, or other reasons. Similarly, content data determined as having a low level of toxicity may be blocked immediately, for example, in case of actual content, content that is strongly copyright protected, etc.

The level of toxicity, in an embodiment, may be set at toxic, i.e. completely or for the major part toxic, non-toxic, or at one or more intermediate levels between toxic and non-toxic. An intermediate level may be allocated if there are serious doubts about the authenticity of the content data stream, which cannot be verified because of difficulties in unambiguously identifying the content for determining the level of toxicity thereof, for example. In an embodiment of the disclosure, each content data stream is presumed to be toxic when received, such that each content data stream is subjected to rendering constraints as disclosed above. Determining the level of toxicity in accordance with the disclosure may involve a decision whether to adapt the presumed level of toxicity. Instead of or in addition to identifying content of a received content data stream for determining its level of toxicity, in a content data stream comprising at least one marker, in an embodiment of the disclosure, the marker may be identified for determining a level of toxicity.

A marker may comprise at least one of:
a watermark encoded in the content data;
pilot signals embedded in the content data;
information relating to the content data as such;
metadata relating to the content data; and
technical data relating to encoding and transmission of the content data.

For the purpose of the disclosure, several information items relating directly or indirectly to a particular content data or content data stream may be used for identifying content data. In practice, watermarked content is comprised in encoded form in the content data stream. In such case, i.e. with an encoded marker, the step of identifying content comprises decoding, by the identification unit, of the encoded watermark or marker.

A level of toxicity is determined, in an embodiment of the disclosure, by evaluating identified content data and/or evaluating an identified marker against available content data and/or marker identification data, and setting a level of toxicity based on a result of such evaluation. In particular in the case of a watermark, having a particular identification, ID, a level of toxicity is determined by detecting the watermark ID, evaluating the detected watermark ID against available watermark IDs, and setting a level of toxicity based on a result of the evaluation.

The evaluation may be performed against data that is locally available, i.e. with the rendering device, for example, or remotely accessible through a communication link, such as a dedicated link, with a remote server and/or remote database, against the content itself and its origin, i.e. available from a content owner, operator, etc. The disclosure as such is not limited to a particular type of watermark or other markers and information.

For watermark detection purposes, a dedicated watermark decoding engine integrated into a decoder of a content rendering device may be used, such as a TV screen, or alternatively in the decoder of a set top box, in a less advanced version of a content rendering device. In an embodiment, the watermark decoding engine may be a simplified version of a watermark decoder present in a decoder of a user device, to avoid interference with a watermark decoder that, for reasons of secrecy, is not accessible for other purposes than internal data processing in the user device.

The ID of a watermark may be at least generic to the content, i.e. a content owner ID, and can be improved with a specific user ID, for example.

The watermark is supposed to be invisible to avoid any user's visual impact and ensure mark robustness, but is not limited thereto. That is, the watermark or in general a marker to be applied for content identifying purposes, may be inserted in the form of parallel metadata or out of resolution information, as mentioned above. Same may be inserted in the audio or video content of a data stream or any other part thereof, such as a header part in packetized content data streams. However, the marker or watermark may also be perceivable, such as visible to an end-user.

In an embodiment of the method according to the disclosure, a plurality of different markers is identified and the toxicity level is further determined and set based on an evaluation amongst the identified markers.

The level of toxicity of a content data stream, ad minima, may be based on detected watermark information. In addition, other information may be used such as codec information, i.e. encoding type, resolution, frame rate, electronic programme guide (EPG) information, CAS/DRM information, but also device type, source type such as STB, TV, USB stick, recognized and possibly paired peripheral devices such a video camera and the like.

If the detection returns an expected value, for example a fully and 99.99% sure ID detection, and linked with other information, for example from an external DB, relaying that the content with this ID is correctly recognized, and matches the resolution, the transmission date and the EPG data, for example, than the level of toxicity can be set at zero, i.e. non-toxic, meaning that the content data in that case is totally genuine or authentic.

Shall the detection returns an unexpected value, such as when e.g. the detection is 90% sure only, and the content resolution doesn't match with the detected ID external information, an appropriate level of toxicity will be associated to this content. For example, when expected content data is identified as 4K content data but is received in High Definition (HD) resolution, this is representative of a transcoded content with size reduction, which is not coherent with the content ID.

Shall the detection return information that the content is watermarked but the watermark is undetectable, then it may be assumed that the official original content has been strongly modified before being played on the content rendering device. Potentially this assumption may be improved by the content origin, for example by determining the source of the content data stream, i.e. is the content data stream received from a peripheral device, such as a USB stick? In the affirmative, the level of toxicity may then be raised to the maximum, i.e. fully toxic.

As explained above, intermediate levels of toxicity may be applied invoking less severe restrictions, for example.

The content data stream may also come directly from internet, on a connected STB or a connected TV, for example. The end users expect to see such content without restriction. Anyway, following the rule that each content is supposed toxic, it will be analysed by the watermark decoder, which will return either nothing in case of pure user generated content (UGC), i.e. content not containing any watermark, for example, or some IDs in the case of sharing of a legitimate content already distributed by an operator, for example. Then a specific toxicity level will be attributed to this content. Depending on the aggregated toxicity level reached, and whether or not the toxicity level threshold is also reached or exceeded, the rendering content data may be then affected or not.

To avoid bypassing or otherwise hindering that a received content data stream is not subjected to a toxicity analysis, in an embodiment of the disclosure the steps relating to identifying content data, determining a level of toxicity, providing at least one of an aggregated level of toxicity and a toxicity level threshold, and rendering content data based on the determined level of toxicity are performed in a secure hardware and/or software environment.

That is, same can be integrated into a hardware dongle, should the TV not natively integrate the appropriate tool, but then being updated with an appropriate secure software to use the dongle, or any other application specific integrated hardware component, for example.

In a second aspect, there is provided a device for rendering content data of a content data stream, the device comprising:

a data receiver, arranged for receiving a content data stream, an identification unit, arranged for identifying content data of the received content data stream, a determination unit, arranged for determining a level of toxicity of the identified content data, the level of toxicity representing a measure of authenticity of the received content data stream, an aggregation unit, for providing an aggregated level of toxicity from said determined level of toxicity, a content data rendering unit, arranged for rendering content data of the received content data stream at a content reproduction device based on the aggregated level of toxicity.

In an embodiment, the device is arranged for rendering content data of a content data stream comprising at least one marker, wherein the identification unit is arranged for identifying content data of the received content data stream by identifying at least one marker in the received content data stream, and wherein the determination unit is arranged for evaluating an identified marker against available marker identification data, and setting a level of toxicity based on a result of the evaluation.

In practice, the determination unit, the aggregation unit and the content data rendering unit may be incorporated in a computer program for loading on a data processor of a data processing device of a content data rendering system, such as a TV or radio receiver, whether or not comprising a STB. The system thus comprises the data receiver, the identification unit, and the content reproduction device. For communication purposes with an external or remote database, for example, a data transmitter is provided.

Some of the units mentioned may be combined and some or all of the operations may be implemented and performed by a computer or data processing device, for example. For the purpose of the disclosure applicable units are commercially available.

In a third aspect, there is provided a computer program product, comprising program code means, arranged to perform the method according to the disclosure as disclosed above, when the program code means are loaded in a working memory of a computer and are executed by the computer. The program code means may also be arranged for being integrated in or added to a computer application comprising application code means for joint execution of the program code means and the application code means by a computer.

The code means, i.e. the computer program, may be stored/distributed on a suitable medium, such as an optical storage medium or a solid-state medium supplied together with or as part of other hardware, but may also be distributed in other forms, such as a signal via the Internet or other wired or wireless telecommunication systems.

The present disclosure may be applied to both audio and/or video. The operation of the content data rendering device is subject to rules: for example, no automatic blocking may be applied when a toxic content is detected. The level of toxicity, and aggregated level of toxicity, and predetermined rules for rendering data content, either available locally in the rendering device or in an external database allow to manage any decision for influencing the rendering and reproduction of content data; same enables messaging/user interaction to incite the user to go for, i.e. obtain, non-toxic or legal content.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
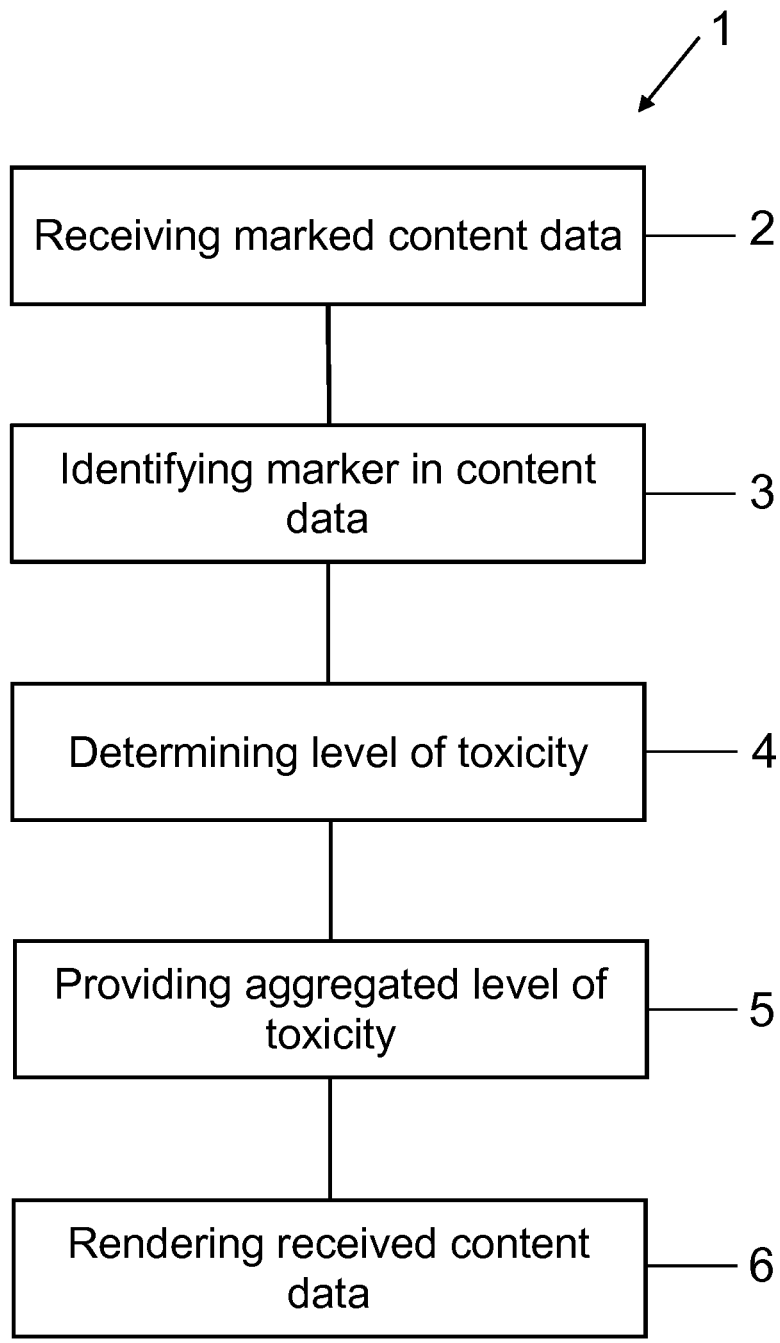
FIG. 1 is a schematic flow chart illustrating a specific embodiment of a method according to the present disclosure.

FIG. 1 is a flow chart illustrating an embodiment of a method according to the present disclosure. This embodiment is directed to a method, generally designated by reference numeral 1, in which at least one marker in the content data stream is used for determining the level of toxicity of the content data stream. It is noted that the present disclosure is also directed to method steps in which the content data itself is used as an input for determining the level of toxicity.

As mentioned before, one of today's main concerns for data content owners is directed to piracy. Many solutions proposed nowadays include the Conditional access System (CAS), and the Digital rights management (DRM).

CAS/DRM schemes comprise various access control technologies that are used to restrict the usage of proprietary hardware and copyrighted content. CAS/DRM technologies tend to control the use, modification, and distribution of copyrighted content data, such as audio or video content, as well as systems within devices that enforce these policies.

Nowadays, a lot of focus is on the applicability of marks, for example watermarks, in the content data stream, wherein the mark comprises a unique identification of a user and is provided with the content data stream. The mark is used for enabling user identification, for example, should the content data stream be shared in an inappropriate manner. Such a mark thus enables the content data stream to be tracked back to the user provided with the content data stream.

Basically, in the prior art, marks are used to determine the origin of the content that is being rendered. Thus, using the mark, the person responsible for the distribution of the content can be tracked.

The present disclosure is directed to the purpose of using the mark for making an end user aware of the likelihood that he or she is watching or listening to a non-original copy of original content. As such, the method 1 according to the present disclosure aims at making the end user aware of the use of illegal content data or at least to the fact that the content data is not used as intended.

One goal of this method is to make sure that the end users are conscious of the fact that they are likely to use illegal, illicit, or at least manipulated, content data.

In order to obtain the above mentioned goal, the method 1 comprises several steps.

In a first step 2, "Receiving marked content data", the marked content data stream is received by a data receiver, for example, integrated in a device for rendering content data. The device for rendering content data is typically a set-top box (STB), a smart television set, or anything alike. The set-top box may contain a television tuner input, being the data receiver, and an output for connection to a television set. More advanced set-top boxes are also provided with an internet connection, for example, via Wi-Fi protocols like 802.11a/b/g/n. According to the present disclosure, the content data stream may be received via any data receiver of the device for rendering content data. The received marked content data stream may be stored locally at the device for rendering content data, or may be streamed directly towards the television set.

In a second step 3, "Identifying marker in content data", an identification unit, for example comprised by the device for rendering content data, is arranged to identify at least one mark in the received content data stream. The at least one mark may, for example, be a data hash or a digital watermark. With a digital watermark the original content data is amended allowing for the subsequent recovery of embedded auxiliary data in the content data.

In order to identify the at least one mark in the content data stream, the device for rendering content data may comprise a dedicated watermark decoding engine. The watermark decoding engine is typically secured such that bypassing of the watermark decoding engine is prevented. As such all content data received is analysed by the watermark decoding engine. Such a secure watermark decoding engine may be obtained using a hardware device like a Field Programmable Gate Array (FPGA), wherein the functionality of the watermark decoding engine is programmed in the FPGA. Another option is to use a processor unit and software running on the processor unit, wherein the software is secured such that it prevents any malicious attempt from the outside to manipulate the software.

As mentioned above, the device for rendering content may be a set-top box or a television set. The watermark decoding engine may be integrated into a hardware dongle, should the television set or the set-top box not natively support the appropriate tools. These devices may then be updated with an appropriate secure software package to use the hardware dongle.

Typically, the identified at least one mark is invisible to the end user to avoid any user's visual impact and ensure mark robustness, but it is not limited to that particular situation. The at least one mark may, for example, also be inserted in the form of parallel metadata or out of resolution information. The at least one mark may be inserted in audio content data or video content data.

In a third step 4, "Determining level of toxicity", a determination unit, for example comprised by the device for rendering content data, is arranged to determine a level of toxicity of the identified marker, wherein the level of toxicity represents a measure of authenticity of the received data content.

It is one of the insights that whenever an original content data is modified, for example transcoded, than the obtained modified content data will also comprise the at least one mark. However, the quality of the at least one mark is affected in case the modification process results in modified content data which is of less quality compared to the original content data. As such, not only the content data is affected but also the at least one mark comprised in the content data.

Modifying of the original content data, for example by a hacker group or the like, may occur in different ways. For example, the original content data is decoded and encoded again however by using a different codec type. For example, Digital Video Disc, DVD, data content is typically coded using MPEG-2. In order to reduce the total size of the content data, the content data is often recoded using a different codec like H.264, MPEG-4 or Advanced Video Coding (AVC). The quality of the watermark in the video content data is in such cases affected, especially in cases where the recoding, i.e. transcoding, is based on a lossy compression.

Lossy compression or irreversible compression is the class of data encoding methods that uses inexact approximations and partial data discarding to represent the content data. These techniques are used to reduce data size for storage, handling, and transmitting content data. This is opposed to lossless data compression which does not degrade the content data. The possible amount of data reduction by using lossy compression is often much higher than through lossless techniques.

In order to efficiently determine the level of toxicity of the identified marker, the determination unit may consult a remote or local database for an original version of the watermark. The obtained original version of the watermark is then correlated with the identified watermark in the received content data. The correlation output provides for a measure in which the obtained original version of the watermark resembled the identified watermark in the received content data. The output of the correlation may then provide the level of toxicity, i.e. represent the measure of authenticity of the received content data.

The original content data may also be modified in a different way, i.e. instead of using a different codec, like explained above. For example, the resolution of the video content data, the depth of the colour schemes and/or the frame rate may be modified all of which result in a lossy compression. As a result of such a lossy compression, the at least one marker, for example the watermark, is degraded in quality as well.

Other aspects may be used as well for determining the toxicity level, i.e. besides using the identified at least one mark in the data content sec for establishing the toxicity level of the content data. For example, in case the determination unit determines that the video content data has a display resolution of 800*600 or 640*480 pixels, than that may be an indication that the content data have been modified as, normally, the video content data will have a resolution much higher than these values. Further, if the determination unit detects that the codec used for the video data content is a codec not related to a particular standard, then that may also be an indication that the original content data have been tampered with. The above are just two examples, besides the watermark aspect as described above, which may be used for determining a level of toxicity of the content data.

In a fourth step 5, "Providing aggregated level of toxicity", an aggregation unit, based on the level of toxicity determined in the previous step, performs a calculation in order to decide whether rendering of the content data needs to be affected or controlled or that the content data may be rendered, i.e. reproduced, as received, for example. Those skilled in the art will appreciate that the aggregated level of toxicity may be calculated continuously and adapted. For example, by continuously determining the level of toxicity of a received content data stream and integrating same over the actual rendering time of the content data, by adding up the levels of toxicity of received data streams in a particular amount of time, etc. The aggregated level of toxicity may be stored, either locally or externally from a content data rendering device, and such stored value may be used for determining the behaviour of a user in consuming toxic content over a longer period of time, for example a week or longer.

The aggregated level of toxicity is, for example, increased when the user accesses illegal contents. Depending on the behaviour of the user, it is also possible to decrease the aggregated level of toxicity when the user watches only legal or licit content during a particular period of time, or when the user receives a mix of a number of toxic and non-toxic content data streams. The aggregated level of toxicity may also be decreased if the user obtains a non-toxic or legal version of particular content data, but may on the other hand be increased when the user does not respond to notification messages, notifying the user of the display of suspicious content. It will be appreciated that the manner of providing an aggregated level of toxicity may be based on many parameters and rules, both technical and non-technical, thereby offering a versatile instrument for rendering toxic content data under control of a legal content provider, producer, etc.

Whether or not to affect the rendering of a received content data stream may be decided upon by setting a toxicity level threshold. The content data rendering will be affected once the aggregated level of toxicity exceeds the set toxicity level threshold. The amount by which the toxicity level threshold is exceeded may correlate with the impact on the content data rendering, for example.

The toxicity level threshold may be pre-set and fixed. However, together with, or as an alternative to, the adaptation of the aggregated level of toxicity, the toxicity level threshold may also be adapted, either dynamically, dependent on the user behaviour in consuming content data, as illustrated above, or updated by an externally generated update signal, provided by a content operator or provider, for example. The toxicity level threshold may be set to a higher value when the user changes his behaviour in the sense of less consuming toxic or suspicious content, but may be lowered otherwise. Rules for managing the toxicity level threshold can be, for example, predetermined in the device for rendering content data, for example implemented in the determination unit, the aggregation unit or a data rendering unit, equipped for comparing the aggregated level toxicity with the toxicity level threshold. However, such rules may also be stored externally from the content data rendering device and operatively communicated therewith.

In a fifth step 6, "Rendering received content data", a content data rendering unit, for example comprised by the device for rendering content, renders the received content data based on the aggregated level of toxicity. This entails, for example, that the set-top box outputs the video content towards a television set or other content reproduction device. In case that the content data is not suspicious, i.e. the aggregated level of toxicity is relatively low, the video data content is outputted to the television set in a regular manner.

The rendering device may decide to alert the end user in case the received data is suspicious, i.e. the aggregated toxicity level is relatively high and reaches or exceeds already a set toxicity level threshold of an authorized toxicity level. The alerting of the end user may be accomplished in a variety of ways.

In a first example, the content data rendering device may decide to simply output video content data in a regular manner for a predetermined amount of time. Once the predetermined amount of time has lapsed, a warning signal may be provided to the end user. The warning signal may, for example, be an overlaying message, i.e. a message overlayed on the video content being played. This example will push the end user to retrieve a legal, or original, version of the video content data.

In a second example, the rendering device may decide to downscale the video content data being played to the end user. That is, for example, if the video content data has a pixel resolution of 4K it may decide to downscale that video content data to a High Definition or a Standard Definition resolution. This may be complemented by opening a web portal and offer the same content in the appropriate resolution and prompt the end user to purchase that content via the web portal, for example.

Figure 2:
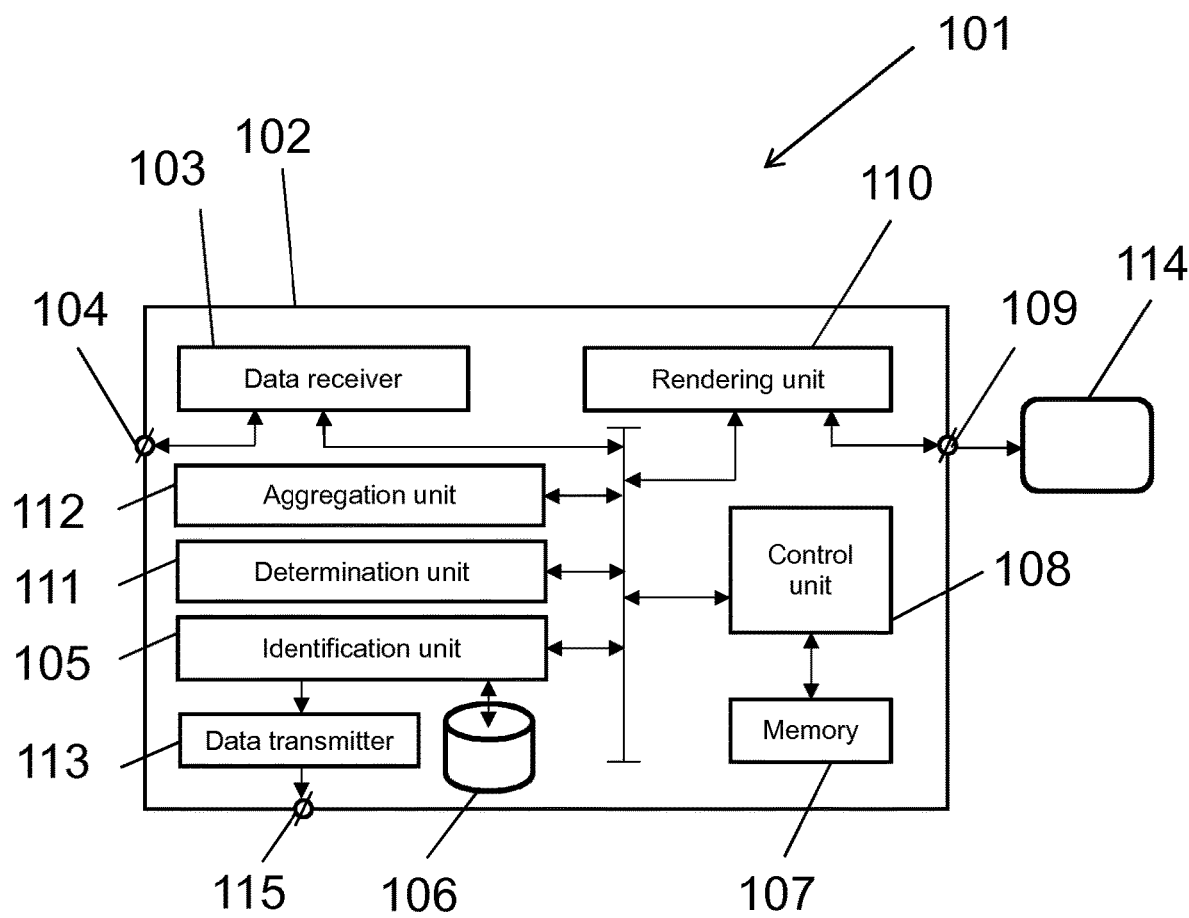
FIG. 2 is an embodiment of a device for rendering content according to the present disclosure.

FIG. 2 is an embodiment of a device 101 for rendering content according to the present disclosure.

The device 101 comprises a data receiver 103 arranged for receiving a content data stream. The content data stream may be received from a content distribution network, a movie distribution platform, a content sharing platform or anything alike.

Further, an identification unit 105 is provided for identifying content data of the received content data stream. As mentioned above, preferably at least one watermark in the content data stream is to be identified. Alternatively, any content which is known beforehand can be used during the identification process. As such, the comparison between the known content and the actual received content can then be used to determine the toxicity level. The identification unit 105 may communicate with a local database 106 to determine whether the marker resembles a marker in the database 106. If so, the identified marker as well as the marker in the database 106 may be provided to the determination unit 111. Alternatively, the identification unit 105 may communicate with an external database (not shown) via a data transmitter 113 and output terminal 115. Typically such a communication is via a public communication network like the internet. Optionally, such a communication may be performed over a secure tunnel such as a Virtual private network, VPN, tunnel.

Next, a determination unit 111 is provided and which is arranged for determining a level of toxicity of the identified content data, the level of toxicity represents a measure of authenticity of the received content data stream. Typically the quality of the received watermark in the content data is used for determining the level of toxicity of the content data. However, as mentioned one paragraph above, any received content may be compared to a known content for determining the level of toxicity.

By an aggregation unit 112, using the level of toxicity determined by the determination unit 111 and parameters, rules and algorithms for aggregating the determined level of toxicity, an aggregated level of toxicity is calculated for deciding upon measures that are to be taken when the rendering device 101 renders toxic content data. The rules, parameters, algorithms, for providing an aggregated level of toxicity as well as a toxicity level threshold, as explained above, may be stored in the database 106, for example.

The device 101 further comprises a content data rendering unit 110 arranged for rendering content of the received content data stream at a content reproduction device 114, based on the aggregated level of toxicity calculated by the aggregation unit 112.

The device 101 further comprises a control unit 108 and a memory 107, which control unit 108 is connected to the data receiver 103, the determination unit 111, the identification unit 105, the aggregation unit 112, and the content rendering unit 110 via a bus connection or the like.

Even further, the incoming content data stream pass through the input terminal 104 before they arrive at the data receiver 103, or data receiving module. The content rendering unit 110 is arranged to render the content data stream via the output terminal 109 at the data rendering device 114, such as a video display, like a TV screen, and/or audio device, such as a loudspeaker.

One of the insights and advantages of the method and device according to the present disclosure is that the quality of the content data stream, more particularly the quality of the identified watermark embedded in the content data stream, may be used for determining a toxicity level which is a measure of authenticity of the received content data stream. As such, the likelihood that the received content data stream is tampered with can be determined to a certain extend, and an end user watching the content data of a received content data stream may be warned or alerted once it is established that it is likely that the content is not authentic.

The present disclosure is not limited to the embodiments as disclosed above, and can be modified and enhances by those skilled in the art beyond the scope of the present disclosure as disclosed in the appended claims without having to apply inventive skills.

Those skilled in the art will appreciate other variations to the disclosed embodiments but comprised by the appended claims from practicing the claimed disclosure and/or from a study of the description, drawings and claims. In the claims, the word "comprising" does not exclude other elements or steps, and the indefinite article "a" or "an" does not exclude a plurality. A single processor or other digital processing unit may fulfil the functions of several items recited in the claims and features recited in mutually different dependent claims may be combined. Reference signs in the claims, if any, are provided for illustrative purposes only.

The invention claimed is:

1. A method of rendering content data of a content data stream, said method comprising the steps of:
receiving, by a data receiver, a content data stream,
identifying, by an identification unit, content data of said received content data stream,
determining, by a determination unit, a level of toxicity of said identified content data, said level of toxicity representing a measure of authenticity of said received content data stream, wherein determining the level of toxicity comprises
evaluating the identified content data against known content data, and setting the level of toxicity based on a result of said evaluation, or evaluating a marker, related to said identified content data and in said received content data stream, against known marker identification data, and setting the level of toxicity based on a result of said evaluation, providing, by an aggregation unit, an aggregated level of toxicity from said determined level of toxicity, rendering, by a rendering device, content data of said received content data stream based on said aggregated level of toxicity.

2. The method according to claim 1, wherein said rendering of content data comprises affecting said rendering of said received content data stream if said aggregated level of toxicity exceeds a toxicity level threshold by applying at least one of:

content data rendering quality constraints,
content data rendering time constraints,
content data rendering selection,
rendering toxicity information messages with rendered content data,
rendering, at least partly, content data other than content data received in said content data stream.

3. The method according to claim 2, wherein at least one of said aggregated level of toxicity and said toxicity level threshold is provided based on at least one of:

number of received content data streams,
content data rendering time,
frequency of content data rendering,
information provided in relation to the content data.

4. The method according to claim 1, wherein determining said level of toxicity comprises setting a toxicity level at one of toxic, non-toxic, and an intermediate level.

5. The method according to claim 1, wherein said marker comprises at least one of:

a watermark encoded in said content data;
pilot signals embedded in said content data;
information relating to the content data as such;
metadata relating to the content data; and
technical data relating to encoding and transmission of the content data;
wherein identifying content data of said received content data stream comprises identifying at least one marker in said received content data stream.

6. The method according to claim 5, wherein said at least one marker is comprised in encoded form in said content data stream, and wherein said step of identifying content data comprises decoding, by said identification unit, said encoded marker.

7. The method according to claim 5, wherein said at least one marker comprises a watermark having a particular identification, ID, and wherein determining a level of toxicity comprises detecting said watermark ID, evaluating said detected watermark ID against available watermark IDs, and setting a level of toxicity based on a result of said evaluation.

8. The method according to claim 5, wherein a plurality of different markers is identified and wherein said level of toxicity is further set based on an evaluation amongst said identified markers.

9. The method according to claim 1, wherein said steps relating to identifying content data, determining a level of toxicity, providing at least one of an aggregated level of toxicity and toxicity level threshold, and rendering content data based on said determined level of toxicity are performed in a secure hardware and/or software environment.

10. A device for rendering content data of a content data stream, said device comprising:

a data receiver, arranged for receiving a content data stream, -an identification unit, arranged for identifying content data of said received content data stream, -a determination unit, arranged for determining a level of toxicity of said identified content data, said level of toxicity representing a measure of authenticity of said received content data stream, wherein determining the level of toxicity comprises evaluating the identified content data against known content data, and setting the level of toxicity based on a result of said evaluation, or evaluating a marker, related to said identified content data and in said received content data stream, against known marker identification data, and setting the level of toxicity based on a result of said evaluation, an aggregation unit, for providing an aggregated level of toxicity from said determined level of toxicity, a content data rendering unit, arranged for rendering content data of said received content data stream at a content reproduction device based on said aggregated level of toxicity.

11. The device according to claim 10, arranged for rendering content data of a content data stream comprising at least one marker, wherein said identification unit is arranged for identifying content data of said received content data stream by identifying at least one marker in said received content data stream.

12. The device according to claim 10, wherein said determination unit, said aggregation unit, and said content data rendering unit are incorporated in a computer program for loading on a data processor of a data processing device of a content data rendering system, said system comprising said data receiver, said identification unit, said content reproduction device and a data transmitter.

13. A computer program product, comprising program code means, arranged to perform the method according to claim 1, when said program code means are loaded in a working memory of a computer and are executed by said computer or when said program code means are integrated in or added to a computer application comprising application code means for joint execution of said program code means and said application code means by a computer.

* * * * *